(12) United States Patent
Rackham et al.

(10) Patent No.: US 6,921,117 B2
(45) Date of Patent: Jul. 26, 2005

(54) GRILL FOR A LAND VEHICLE AND ALSO A LAND VEHICLE HAVING A GRILL

(75) Inventors: Peter John Rackham, Dereham (GB); Michael Tate, Great Yarmouth (GB)

(73) Assignee: Axelchoice Limited (GB)

( * ) Notice: Subject to any disclaimer, the term of this patent is extended or adjusted under 35 U.S.C. 154(b) by 0 days.

(21) Appl. No.: 10/344,295

(22) PCT Filed: Aug. 8, 2001

(86) PCT No.: PCT/GB01/03563
§ 371 (c)(1),
(2), (4) Date: Jan. 26, 2004

(87) PCT Pub. No.: WO02/12028
PCT Pub. Date: Feb. 14, 2002

(65) Prior Publication Data
US 2004/0124670 A1 Jul. 1, 2004

(30) Foreign Application Priority Data
Aug. 8, 2000 (GB) .............................. 0019476

(51) Int. Cl.$^7$ ............................................. B60R 19/52
(52) U.S. Cl. ................ 293/115; 296/187.09; 296/193.1
(58) Field of Search ......................... 296/181.2, 187.03, 296/187.09, 193.1; 293/115

(56) References Cited

U.S. PATENT DOCUMENTS

| | | | |
|---|---|---|---|
| 4,917,203 A | | 4/1990 | Sacco et al. |
| 4,944,540 A | * | 7/1990 | Mansoor et al. ............. 293/115 |
| 5,403,048 A | * | 4/1995 | Ekladyous et al. ......... 293/115 |
| 5,478,127 A | | 12/1995 | Chase |
| 5,482,336 A | * | 1/1996 | Rouse et al. ................ 293/115 |
| 5,503,444 A | | 4/1996 | Rouse et al. |
| 5,880,394 A | | 3/1999 | Kim |
| D431,505 S | * | 10/2000 | Kitamura et al. .......... D12/163 |
| 6,206,438 B1 | * | 3/2001 | Pueyo ......................... 293/115 |
| 6,405,819 B1 | * | 6/2002 | Ohkura et al. ............. 180/68.1 |
| 6,702,343 B1 | * | 3/2004 | Stull ........................... 293/115 |

FOREIGN PATENT DOCUMENTS

| | | | |
|---|---|---|---|
| DE | 2727517 A | * | 12/1978 |
| DE | 4321969 | | 7/1992 |
| EP | 0896892 | | 2/1999 |
| EP | 0906863 | | 4/1999 |
| GB | 2327912 | | 10/1999 |

OTHER PUBLICATIONS

PCT International Search Report (International Application No. PCT GB 01/03563) International Filing Date Aug. 8, 2001 (Earliest) Priority Date Aug. 8, 2000.

PCT Written Opinion from the International Preliminary Examining Authority Mailed Jun. 3, 2002 for International Application No. PCT/GB 01/03563.

PCT Written Opinion (PCT Rule 66) mailed Aug. 21, 2002 from the International Preliminary Examining Authority for International Application No. PCT/GB01/03563.

PCT International Preliminary Examination Report, Date of Report Dec. 5, 2002, Authorized officer Petersson, M. for International application No. PCT/GB01/03563.

Combined Search and Examination Report under Sections 17 and 18 (3), written by Peter Gardiner, Examiner, Mailed on Oct. 25, 2000 for Application No. GB 0019476.1.

* cited by examiner

*Primary Examiner*—Patricia L. Engle
(74) *Attorney, Agent, or Firm*—Luedeka, Neely & Graham, P.C.

(57) ABSTRACT

The present invention provides (with reference to FIG. 1) a land vehicle having bodywork which defines an aperture (11) in which a grill (10) is secured by mounting means (20, 21, 22). The mount means (20, 21, 22) comprises an elastically deformable non-metallic material which can deform to allow the grill (10) to move relative to surrounding bodywork when the grill (10) receives an impact, thereby absorbing energy of the impact, and which can subsequently return to the original shape thereof and thereby restore the grill (10) to the pre-impact position thereof. The present invention also relates to a grill (10) compound of a composite material comprising fibres set in a matrix.

16 Claims, 3 Drawing Sheets

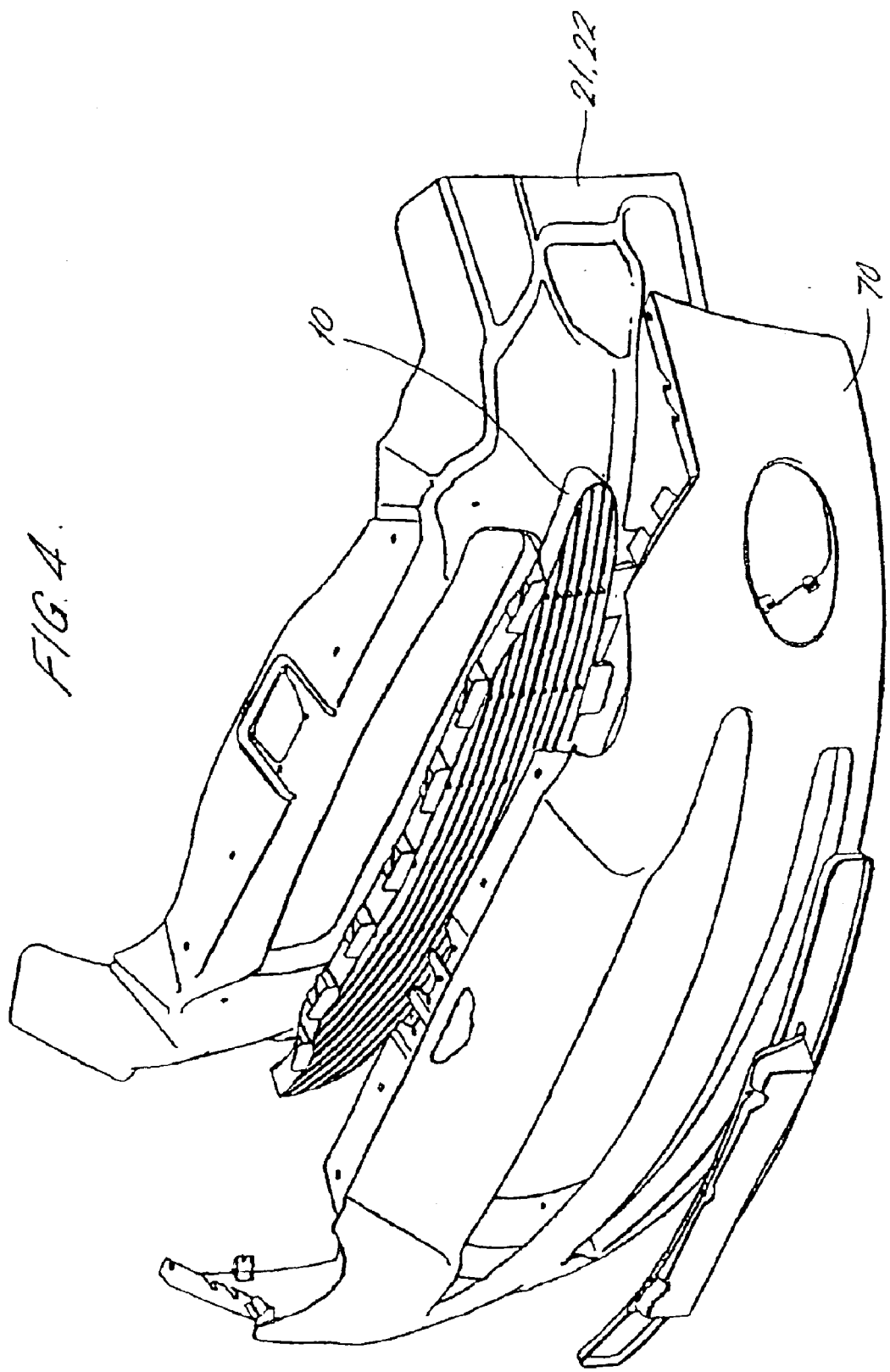

GRILL FOR A LAND VEHICLE AND ALSO A LAND VEHICLE HAVING A GRILL

The present invention relates to a grill for a land vehicle and also a land vehicle having a grill.

A grill is typically provided in an aperture defined at the front of a land vehicle by bodywork of the vehicle. Sometimes the aperture is defined in the bonnet of the vehicle at the front of the bonnet. Sometimes the aperture is defined between the bonnet of the vehicle and the wings of the vehicle and the bodywork forming the remainder of the front of the vehicle. Sometimes the aperture is defined completely by the bodywork forming the front of the vehicle. The aperture is designed to allow a flow of cooling air therethrough, typically to cool a radiator located immediately behind the aperture. A grill is usually included in the aperture for aesthetic reasons and also for the purpose of preventing large objects passing through the aperture, which could otherwise damage e.g a radiator located behind.

It is a requirement of current legislation that the front of a vehicle must be able to withstand a low-velocity impact (e.g. of the type incurred during parking accidents) without sustaining substantial damage. A test has been devised for this called "pendulum" test because it involves swinging a pendulum ball of the specified size and weight at a specified velocity at the front of a vehicle and then assessing the damage to the front of the vehicle afterwards.

A standard grill is made of metal and connected by metal fixings to the surrounding bodywork. It does not fare well in the pendulum test. To pass the test the grill must be capable of absorbing enough of the impact that the bodywork surrounding the grill does not sustain substantial damage in the pendulum test. Generally speaking the pendulum test has required designers to reduce the size of apertures at the fronts of vehicles so that the impacts are reacted by the bodywork of the vehicles rather than by grills. This has detrimental aesthetic effects and also this can reduce the flow of cooling air detrimentally.

In a first aspect the present invention provides a land vehicle having bodywork which defines an aperture in which a grill is secured by mounting means wherein the mounting means comprises an elastically deformable non-metallic material which can deform to allow the grill to move relative to surrounding bodywork when the grill receives an impact, thereby absorbing energy of the impact, and which can subsequently return to the original shape thereof and thereby restore the grill to the pre-impact position thereof.

In this aspect the invention provides an automobile which has a grill secured in an aperture by the mounting means which will allow the grill to react to an impact by moving, with the mounting means absorbing the energy of the impact and subsequently returning the grill to its pre-impact position.

In a second aspect the present invention provides a grill for attachment in an aperture defined in bodywork of a land vehicle, the grill being composed of a composite material comprising fibres set in a matrix.

In the past, grills when formed as separate components have physically been formed from metal. Otherwise, when grills have been formed from polymeric or plastics materials they have generally been formed as part of a larger component, rather than an independent component. The present invention has recognised that it is advantageous to form as an independent component a grill from a fibre reinforced material, because this gives the grill good stiffness and impact resistance.

A preferred embodiment of the present invention will now be described with reference to the accompanying drawings in which:

FIG. 4 is an exploded view of the front of an automobile according to the present invention.

Figure 1:
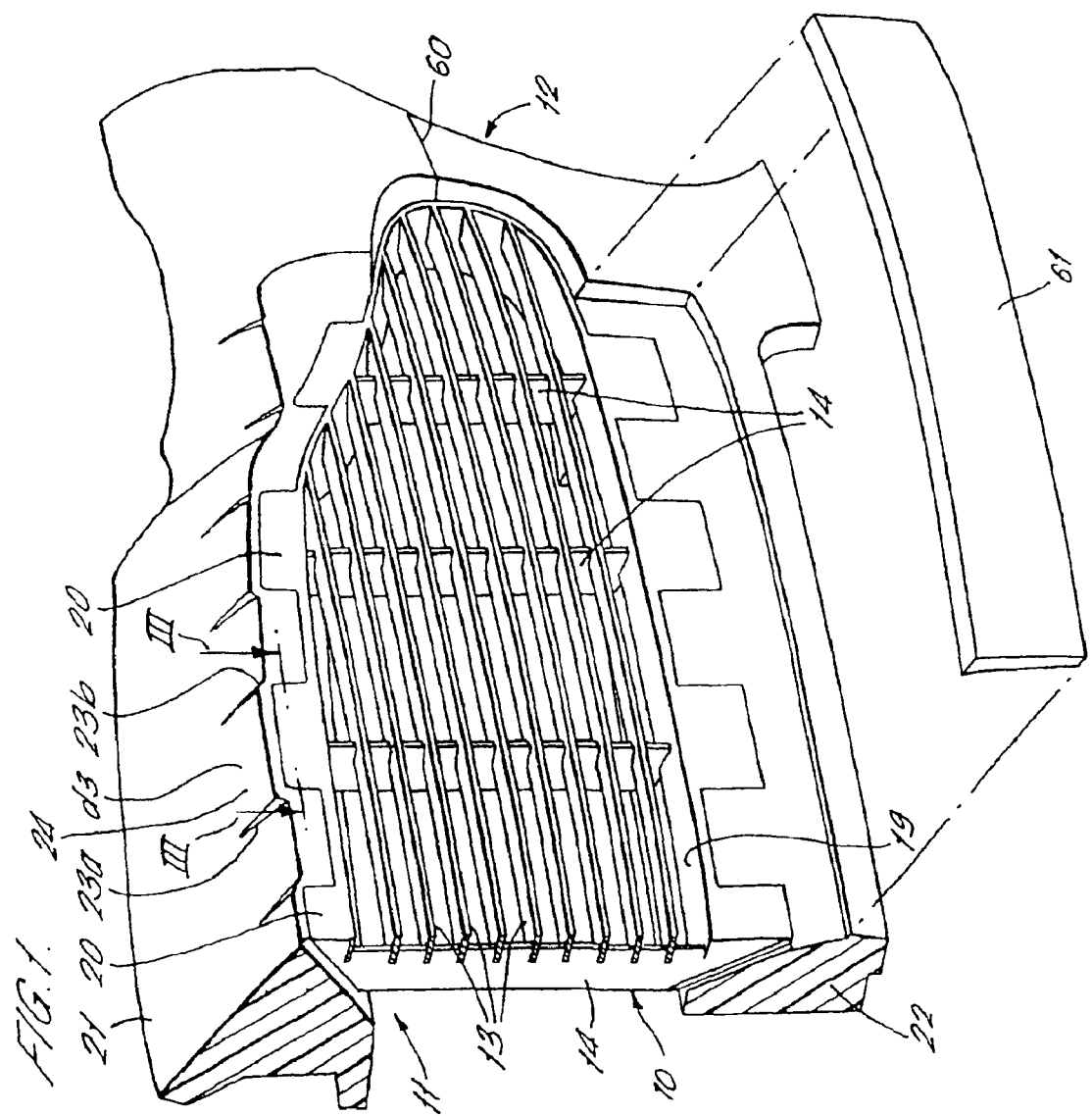
FIG. 1 is a schematic representation of a front of an automobile according to the present invention having an aperture defined in the bodywork of the automobile in which is secured a grill according to the present invention.

Turning first to FIG. 1, there can be seen a grill 10 which is secured in an aperture 11 defined by the bodywork 12 of an automobile. Only a part of the bodywork 12 of the automobile is shown, the front part of the bodywork.

The grill 10 is made from glass-fibre reinforced heat stabilised nylon, the properties of which will be described later. The grill 10 is a one-piece moulding.

The grill 10 comprises a series of slats 13 which when the grill 10 is mounted in position extend generally horizontally. The grill 10 also has a plurality of slats 14 which extend perpendicularly to the slats 13 and which extend (when the grill 10 is mounted in position) generally vertically.

Figure 2:
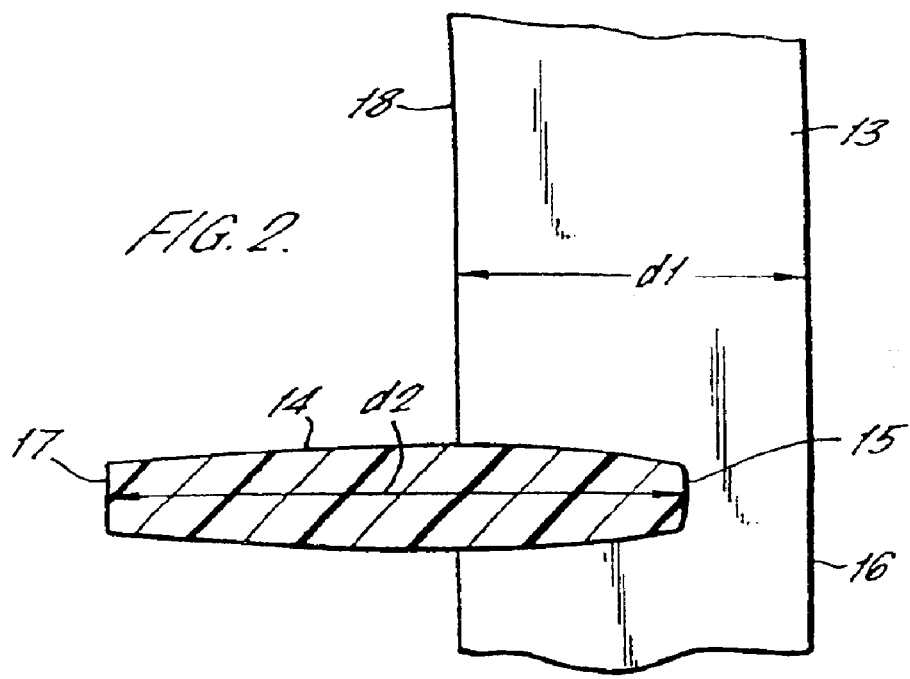
FIG. 2 is a cross-section through part of the grill illustrated in FIG. 1.

FIG. 2 shows a cross-section through the grill 10. A slat 13 can be seen in plan view and the slat has a depth d1. The view shows a cross-section through a slat 14 and the slat 14 has a depth d2 which is larger than the depth d1. The leading edge 15 of the slat 14 is spaced rearwardly from the leading edge 16 of the slat 13. The trailing edge 17 of the slat 14 is displaced rearwardly from the trailing edge 18 of the slat 13.

In the preferred embodiment the dimension D2 is 42.7 mm and the trailing edge 17 of the slat 14 is located 24.6 mm behind the trailing edge 18 of the slat 13.

The grill 10 has slats as shown in FIG. 2 in order that the grill 10 has the necessary structural rigidity. In order for the grill 10 to have the necessary structural rigidity the slats 14 must be of a minimum depth. It is preferred that the slat 14 have the greatest depth for aesthetic reasons. The trailing edge portions of the slats 14 are not readily visible to the exterior of the vehicle and since the slats 14 are less numerous than the slats 13 the overall aesthetics of the grill are not compromised.

Figure 3:
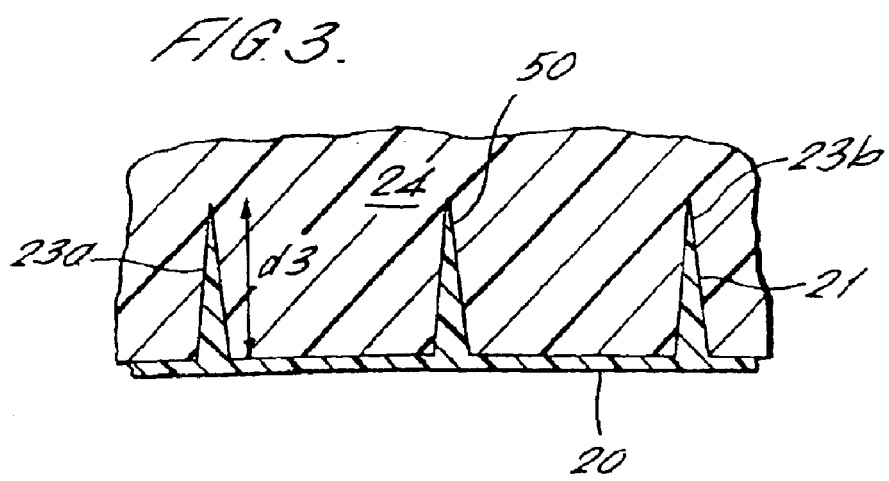
FIG. 3 is a cross-section taken through a flange 20 of the grill of FIG. 1 and the immediately adjacent foam material.

The grill 10 has a continuous perimeter 19 which surrounds and supports the slats 13 and 14. Extending outwardly from the continuous perimeter 19 are a plurality of flanges 20, which are spaced apart from each other around the perimeter. Each flange 20 has a generally flat rear facing surface which abuts and which is adhered to a part of a supporting substrate 21, 22. The supporting substrate 21, 22 forms a mount for the grill 10 whereby the grill 10 can be secured in the aperture 11. Each flange 20 will have a rearwardly extending protrusion for insertion into a slot in the supporting substrate, e.g. in FIG. 3 a flange 20 can be seen to have a protrusion 30 which extends rearwardly in a slot in a supporting substrate 21.

The supporting substrate 21, 22 is formed from an elastically deformable non-metallic material, in the preferred embodiment a foamed material. The foamed material is provided with a plurality of slits, which are provided in pairs, one pair of slits being associated with each of the flanges 20. For instance, slits 23a and 23b are provided associated with one flange 20. The slits extend rearwardly from the front edge of the substrate 21 rearwardly for a distance d3. The slits define a region 24 in the supporting substrate 21 which is isolated from the surrounding support substrate apart from to the rear of the region. This means that for initial motion of the grill 10 only defined regions react to the loading.

The front of the substrate in the region 24 is adhered to the rear surface of the flange 20. When the grill 10 reacts a minor impact, the force of the impact is transmitted through the flange 20 to the region 24 and the material in the region 24 compresses to allow the grill 10 to move in its aperture. The material of the substrate in the region 24 is of an elastic nature and therefore after the impact the material reacts to return the grill 10 to its pre-impact position.

Each of the flanges 20 is supported by an underlying isolated region (e.g. 24) in the supporting substrate 21, 22.

The supporting substrate 21, 22 will absorb energy of low velocity impact on the grill 10 by compressing and thereby absorbing energy of the impact. The grill itself remains undamaged and is returned into position after the impact.

A panel 61 is shown in FIG. 1 which will be secured in a matching recess in the moulded substrate arrangement 22, in order to secure the grill 10 in position.

The material used for the grill is preferably VERTON$^{(RTM)}$ RF-EM-HS Series material provided by LNT Engineering Plastics Inc of 475 Creamery Way, Exton, Pa. 19341-2537 (Telephone No. +1-610-363-4500, Facsimile No. +1-610-363-4749, website: http://www.lnp.com). The properties of the material used are as follows:

22 is attached to and supported by a part of the crash structure of the vehicle.

As can be seen in FIG. 4, a skin 70 of R-RIM MOULDING POLYOL DALTORIM$^{(RTM)}$ Ef 20510, 150 SUPRASEC$^{(RTM)}$ 2010±15% HMG is used to cover the foam substrate 21, 22. The skin provides the finish to the vehicle.

Whilst above the preferred embodiment has been described which shows a grill for the front of the vehicle in an aperture through which air can pass to a radiator, the invention could be equally well used wherever grills are mounted in apertures. Whilst the preferred embodiment is described in relation to an automobile, the invention could be used on any land vehicle, e.g a truck or motor car. Whilst it is preferred that the mountings used in the invention are of the form described above and illustrated in the attached drawings, it is within the scope of the invention to have mounts comprising a plurality of individual blocks of elastically deformable foamed material instead of the substrate referred to above.

Whilst it is preferred that the grill has a first plurality of slats which extend horizontally and a second plurality of slats which extend vertically, the grill could have slats extending at different angles, e.g. each slat could extend at 45° to the horizontal plane to form a different pattern of mesh.

| PROPERTY | ASTM Method | UNITS | VERTON*RF-700-10 EM HS 50% long glass fibre |
|---|---|---|---|
| PHYSICAL | | | |
| Specific Gravity | D 792 | N/A | 1.570 |
| Shrinkage | D 955 | % @ 0.125" | .30 to .40 |
| Melt Point (resin) | D 3418 | F. (C.) | 470.0 (243.3) |
| Water absorption | D 570 | % | .40 |
| MECHANICAL | | | |
| Tensile Strength | D638 | PSI (N/m$^2$) | 37,000 (25.51 × 10$^7$) |
| Tensile Elongation | D638 | % | 2.0 to 4.0 |
| Flexural Strength | D790 | PSI (N/m$^2$) | 58,000 (39.99 × 10$^7$) |
| Flexural Modulus | D790 | PSI (N/m$^2$) | 2,300,000 (1.58 × 10$^{10}$) |
| IZOD Impact cut notch (⅛") (3.175 mm) | D256 | FT-LB/IN | 6.00 |
| IZOD Impact (unnotched) | D256 | FT-LB/IN | 25.0 to 27.0 |
| Compressive Strength | D695 | PSI (N/m$^2$) | 39,600 (27.3 × 10$^7$) |
| THERMAL | | | |
| H.D.T.U.L (Deg F. (Deg C.); @ 264 PSI (1,820,217 N/m$^2$) | D648 | F. (C.) | 470 (243.3) |
| Coeff.Lin.Therm.Expansion | D696 | IN/IN/F 10E−S | .9000 |
| TRIBOLOGICAL | | | |
| Wear Factor (K) | LNP#3 | 10E−10 | 30 |
| Coeff. of Friction Dynm. | LNP#3 | 40 PSI (275,790 N/m$^2$), 50 FPM (0.254 m/s) | .32 |

Whilst the above is the preferred material it is envisaged that other composite materials could be used. For instance, a material could be used comprising carbon fibres set in an epoxy resin matrix or glass fibres set in a polyurethane matrix or several other combinations.

The supporting substrate is formed from two components 21, 22. Each component is formed from low density self-skinning foam of a density of 80 Kg/m$^3$. Each component is moulded in a two part aluminium mould by a reaction injection moulding technique (the material foams in the mould to expand to take the required shape). The two components 21, 22 meet along a common join line 60, but are free to move relative to each other. Each component 21,

What is claimed is:

1. A land vehicle having bodywork which defines an aperture in which a grill is secured by mounting means wherein the mounting means comprises an elastically deformable non-metallic material which can deform to allow the grill to move relative to surrounding bodywork when the grill receives an impact, thereby absorbing energy of the impact, and which can subsequently return to the original shape thereof and thereby restore the grill to the pre-impact position thereof, characterised in that the mourning means comprises a support substrate having slits extending therethrough rearwardly from a front surface of the substrate which abuts part of the rear surface of the grill.

2. A land vehicle as claimed in claim 1 wherein the grill has a plurality of flanges spaced apart about the periphery thereof, the flanges forming the points of attachment of the grill to the support substrate, the support substrate being attached to rear facing surfaces of the flanges and the support substrate having the slits therein arranged as a plurality of pairs of slits, each pair of slits being associated with one flange, the slits of each pair being spaced apart one on either side of a flange to define therebetween an isolated region in the support substrate isolated from the remainder of the support substrate apart from to the rear thereof, the material in each isolated region deforming when force is transmitted to the isolated region from the flange associated therewith.

3. A land vehicle as claimed in claim 2 wherein the support substrate is formed from a foam material.

4. A land vehicle as claimed in claim 2 wherein the support substrate comprises at least one moulded component.

5. A land vehicle as claimed in claim 4 wherein the moulded component is moulded to a shape which at least in part matches the front external shape of the automobile.

6. A land vehicle as claimed in claim 3 wherein the support substrate comprises two moulded components.

7. A land vehicle as claimed in claim 1 wherein the grill is non-metallic.

8. A land vehicle as claimed in claim 7 wherein the grill is composed of a composite material.

9. A land vehicle as claimed in claim 8 wherein the grill is formed from a fibre reinforced polymeric material.

10. A land vehicle as claimed in claim 9 wherein the grill is formed from glass fibre reinforced nylon.

11. A land vehicle as claimed in claim 10 wherein the grill is a one-piece moulded component.

12. A land vehicle as claimed in claim 1, wherein the grill is composed of a composite material comprising fibres set in a matrix, the grill comprising a central mesh region supported and surrounded by a continuous perimeter, wherein the central mesh region comprises:

a first plurality of spaced apart parallel slats which extend generally horizontally when the grill is secured in the aperture in the bodywork; and a second plurality of spaced apart parallel slats which extend perpendicularly to the slats of the first plurality and which extend generally vertically when the grill is secured in the aperture in the bodywork;

and wherein the slats of the second plurality have a depth which is greater than the depth of the slats of the first plurality.

13. A land vehicle as claimed in claim 12 wherein leading edges of the slats of the second plurality are located rearward of the leading edges of the slats of the first plurality and the rearward edges of the slats of the second plurality are spaced behind the rearward edges of the slats of the first plurality.

14. A land vehicle as claimed in claim 12 wherein the composite material comprises glass fibres set in a nylon matrix.

15. A land vehicle as claimed in claim 12 wherein said grill is a one-piece moulded component.

16. A land vehicle as claimed in claim 12 wherein said grill further includes a plurality of flanges which extend outwardly from the perimeter.

\* \* \* \* \*